(12) United States Patent
Wilhelm et al.

(10) Patent No.: US 6,315,127 B1
(45) Date of Patent: Nov. 13, 2001

(54) SYSTEM AND METHOD FOR REMOVING PARTICULATE CONTAMINANTS FROM FLUID STREAMS

(75) Inventors: David K. Wilhelm, Neenah, WI (US); Stephen P. Makris, Duluth; Sujit Banerjee, Marietta, both of GA (US)

(73) Assignee: Institute of Paper Science and Technology, Inc., Atlanta, GA (US)

( * ) Notice: Subject to any disclaimer, the term of this patent is extended or adjusted under 35 U.S.C. 154(b) by 0 days.

(21) Appl. No.: 09/302,973

(22) Filed: Apr. 30, 1999

(51) Int. Cl.[7] .............................. B03B 13/00; B04C 5/26
(52) U.S. Cl. .............................. 209/11; 209/726; 209/729
(58) Field of Search .................. 209/11, 725, 726, 209/728, 729, 727; 210/512.1

(56) References Cited

U.S. PATENT DOCUMENTS

| 4,386,519 | * | 6/1983 | Sinkey | 209/726 X |
| 4,670,161 | * | 6/1987 | Hayatdavoudi | 209/726 X |
| 5,888,389 | * | 3/1999 | Griffith et al. | 210/175 |
| 5,996,690 | * | 12/1999 | Shaw et al. | 166/250.1 |

FOREIGN PATENT DOCUMENTS

1220214 * 1/1968 (GB) ................................. 209/726

* cited by examiner

*Primary Examiner*—Tuan N. Nguyen
(74) *Attorney, Agent, or Firm*—Fitch, Even, Tabin & Flannery

(57) ABSTRACT

The present invention is directed to a system and method for removing particulate contaminants from a fluid stream where the particulate contaminants have densities equal to or approximating the density of the carrier fluid.

16 Claims, 1 Drawing Sheet

STICKIES IN REJECT STREAMS CLEANED AT VARIOUS TEMPERATURES

SYSTEM AND METHOD FOR REMOVING PARTICULATE CONTAMINANTS FROM FLUID STREAMS

BACKGROUND OF THE INVENTION

The present invention relates to a system and method for removing particulate contaminants from a fluid stream. More particularly, the present invention is directed to a system and method for removing particulate contaminants from a fluid stream where the particulate contaminants have densities equal to or approximating the densities of the carrier fluid.

Purification of fluid streams through removal of particulate matter is important in several industrial processes. As it has become popular and necessary to recycle paper and paper related products, the recycle content in most products has increased. However, the nature of recycled material introduces many contaminants to manufacturing processes that wreak great havoc if not removed or otherwise dealt with properly. Increased recycle content and the push for further water system closure is resulting in higher concentrations of contaminants in mills. This has added a new degree of complexity to the already daunting task of providing uniform and clean recycle furnish.

Stickies are contaminants in recycled pulp that arise from the repulping of the many different types of adhesives associated with newspapers, advertisements, junk mail and a host of other sources. Stickies cost the pulp and paper industry between $700–$800 million per year.

Stickies-generating materials come from many different chemical sources in recycled fiber. The predominant contributors are pressure-sensitive adhesives, nonpressure-sensitive adhesives and packaging adhesive products, various paper coatings, waxes, and thermoplastic, nonimpact print toners. Chemical analysis of stickies particles taken from commercial deinking equipment show the particles are actually an agglomeration of many different chemical products. Stickies are not generally derived from a single contamination source. This further complicates the problem since the chemistries of several different materials must be addressed to effect their efficient removal.

One approach in controlling stickies is to not let them enter the mill in the furnish. By careful inspection of the wastepaper being brought into the mill, stickies problems can be prevented. This sorting method is manual labor intensive to effectively reject wastepaper with a high degree of stickies contamination, increasing the cost of raw material. Also, this does not solve the problem of stickies in a global sense, it just transfers them to someone else. Most mills have increased spot-checks and rejections of suspect raw materials.

Another approach for controlling stickies is directed to process improvements. By improving the process of pulping and deflaking, fewer of the stickies will be broken down into smaller particles that can travel through screens and cleaners. Optimizing pulping parameters such as pulper configuration, temperature, intensity and consistency can improve process performance. It is difficult to optimize these parameters, as the nature of recycled wastepaper does not allow for the quality control tolerance of virgin pulp. Therefore, the variation in furnish is not receptive to one optimum set of pulping parameters. Auxiliary pulping equipment is available for contaminant removal, but there effect on removing stickies has not been clearly demonstrated.

The majority of stickies removal occurs during screening and cleaning. Fine screens are very effective in removing macro stickies. However, as the slots in the screens are made smaller in order to remove more contaminants, fiber fractionation (fiber loss) occurs. At this point in the process the stickies are small (<0.15 mm), as long as they do not agglomerate, but may still be visible in the final product. Dispersion will break the stickies up further and is dependent on consistency, temperature and pressure. Since the ink particles in the deinked pulp tend to be associated with the stickies, dispersion of the stickies-ink complex can lead to a decrease in brightness.

Finally, another approach to controlling stickies includes the use of chemical additives. There are many different chemicals used for stickies control including talc, solvents, dispersants, cationic polymers synthetic fibers, zirconium compounds and alum sequestering agent. The additives use dispersion, detackification, fixation, passivation or cleaning mechanisms, either alone or in combination. Additives can be costly and usually act as a band aid and not a solution. Talc, synthetic fibers, and zirconium compounds stabilize stickies by detackifying them, but the particle size is not reduced. These complexes are shear sensitive and additional stickies surfaces can be exposed. Dispersants break down the particle size and prevent reagglomeration. Dispersants are pH and temperature sensitive, and compatibility with existing chemistry as well as environmental issues may be encountered.

Removal of many type of contaminants is commonly effected through centrifugal cleaning. In centrifugal cleaning, differences in density between the particulate matter and the fluid are exploited to separate particles from the fluid. In the particular case of paper recycling, the density of some contaminants is very similar to that of the process water. In paper recycling, contaminants of specific gravity significantly higher than unity (the specific gravity of the process medium) are rejected through their passage through forward cleaners. Contaminants of specific gravity significantly lower than unity are removed through reverse cleaners. Various configurations of centrifugal cleaners have been disclosed in U.S. Pat. No. 5,566,835 to Grimes, U.S. Pat. No. 4,259,180 to Surakka et al., U.S. Pat. No. 4,226,707 to Boivin, U.S. Pat. No. 4,309,283 to Vikio et al., and U.S. Pat. No. 4,622,132 to Chupka. Both forward and reverse cleaners are expected to be transparent to contaminants of specific gravity very close to or equal to unity.

In a paper recycling operation, the specific gravities of some contaminants will usually approximate unity. Even if the specific gravities of the individual contaminants are either greater than or less than unity, the individual contaminants can combine, and the specific gravity of some combinations may approximate unity. The removal of these contaminants, or combinations thereof, is presently impossible through centrifugal cleaning technology.

It is an object of the present invention to provide a system and method for removing particulate contaminants from a fluid stream where the particulate contaminants of the fluid stream have densities equal to or approximating the density of the carrier fluid.

Other objects, advantages, features and characteristics of the present invention will become more apparent upon consideration of the following description and the appended claims.

SUMMARY OF THE INVENTION

The present invention is directed to a system and method for removing particulate contaminants from a fluid stream, where the particulate contaminants have densities equal to or approximating the density of the carrier fluid. In accordance with the present invention, it has been found that certain particulate contaminants have a different coefficient of thermal expansion than their carrier fluid. Hence, the specific gravity of certain particulate contaminants will be different from that of the carrier fluid at a given temperature. In an important aspect, the system and method of the present invention utilizes the difference between the specific gravity of certain particulate contaminants and their carrier fluid at certain temperatures to effect removal of particulate contaminants from a fluid stream through the use of centrifugal cleaners.

In accordance with the present invention, a fluid stream containing particulate contaminants is supplied to at least one first centrifugal cleaner. The centrifugal cleaner is operated in a manner effective for removing particulate contaminants from the fluid stream which have a specific gravity of at least about 0.0001 different from the specific gravity of the carrier fluid. In an important aspect of the invention, the temperature of the carrier fluid leaving the cleaner is adjusted in an amount effective to provide particulate contaminants remaining in the fluid stream with a specific gravity of at least about 0.0001 different from the specific gravity of the carrier fluid.

In various embodiments of the invention, the temperature of the fluid stream exiting the first centrifugal cleaner may be adjusted and then cycled back to the first centrifugal cleaner, or it may be cycled back to the first centrifugal cleaner where its temperature is subsequently adjusted prior to operation of the cleaner. In this aspect of the invention, the centrifugal cleaner may be forward or reverse centrifugal cleaners.

In another important aspect of the invention, the fluid stream exiting the first centrifugal cleaner is supplied to at least one second centrifugal cleaner. The fluid stream being supplied to the second centrifugal cleaner has a temperature effective for providing the particulate contaminants with a specific gravity of at least about 0.0001 different from the specific gravity of the fluid stream. The temperature of the carrier fluid may be adjusted prior to its entering the second centrifugal cleaner or it may be adjusted with its entrance to the second centrifugal cleaner. In another aspect of the invention, more than one second centrifugal cleaner may be operated in series. The fluid stream can be at the same or different temperatures for each additional centrifugal cleaner in the series as long as the temperature of the fluid stream is adjusted for at least one of the second centrifugal cleaners. In this way, a higher percentage removal of particulate contaminants may be realized. The second centrifugal cleaner or cleaners are operated in a manner effective for removing particulate having a specific gravity of at least about 0.0001 different from the specific gravity of the carrier fluid. In this aspect of the invention, the centrifugal cleaner or cleaners may be forward or reverse centrifugal cleaners.

DETAILED DESCRIPTION

Definitions

As used herein, "particulate contaminant" means any particle that has a thermal expansion coefficient that is different from the carrier fluid. Particulate contaminant may include stickies.

As used herein, "fluid stream" includes the carrier fluid and any particulate contaminants entrained in the fluid stream. The fluid stream may include process streams generated by industrial recycling processes, such as for example paper recycling.

As used herein, "carrier fluid" refers to a medium in which particulate contaminants may be entrained The carrier fluid may be the liquid such as water, a liquid that includes a mixture of water and organic solvent, or an organic solvent.

As used herein, "centrifugal cleaner" means either a forward or reverse centrifugal cleaner. An example of forward centrifugal cleaner includes the POSIFLO cleaner manufactured by Beloit Corp., Pittsfield, Mass. and an example of reverse centrifugal cleaners include the UNIFLO cleaner manufactured by Beloit Corp., Pittsfield, Mass.

As used herein, "stickies" refers to contaminants in recycled pulp that arise from the repulping of different types of adhesives associated with newspapers, advertisements, junk mail and a host of other sources. Stickies may include adhesive resins such as styrene butadiene rubber, polyvinyl acetate, polyisoprine, ethylvinyl acetate, polyisoprene, ethylvixylautate, phythalate esters, styrene ester copolymers, and resins that include acrylates and vinyl acetate. Stickies may be classified according to size as either macrostickies (>150 microns) or microstickies (<150 microns).

Forward cleaners are usually able to separate particles of specific gravity greater than about 1.02. Reverse cleaners usually separate particles of specific gravity lower than about 0.98. As a result, centrifugal cleaner technology is inefficient for particles of specific gravity ranging between 0.98 to 1.02. This inefficiency is only maintained if the density of the fluid stream remains unchanged during its passage though both forward and reverse cleaners.

Operating Environment

Figure 1:
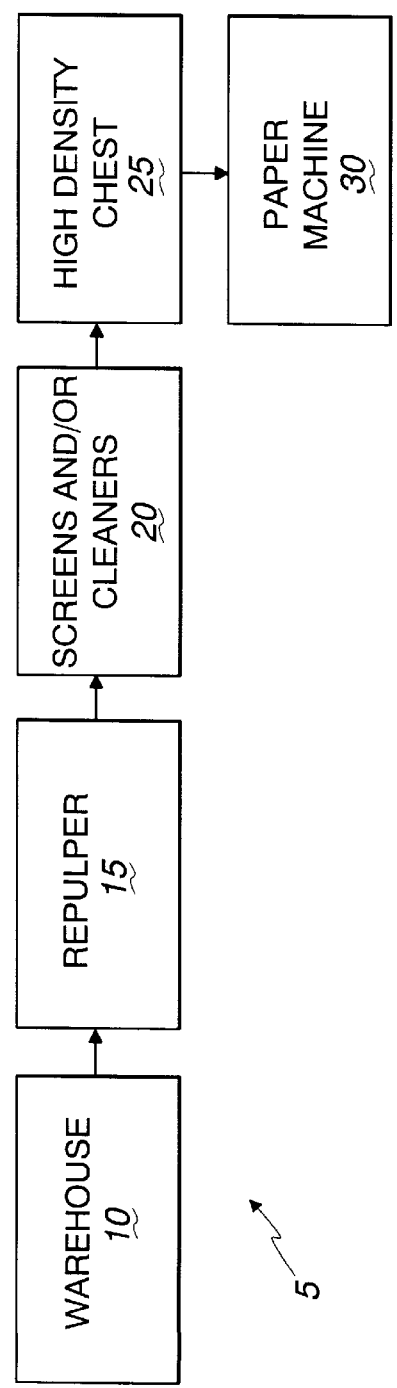
FIG. 1 illustrates the operating environment for the recycling portion of a mill in accordance with an exemplary embodiment of the present invention.

Referring to FIG. 1, the typical environment for recycling operations 5 in a paper mill is shown in accordance with the present invention. Recyclable material, such as old newsprints, old magazines, and other wastepaper, usually is stored in a mill warehouse 10. These materials are transported from the mill warehouse 10 to a repulper 15 for pulping the recyclable material. The repulper 15 is generally a disintegrator made up of a vessel fitted with a suitable agitator for breaking up and defibering dry recyclable material in water to form a slurry. During the pulping process, the slurry is usually mechanically and chemically treated to improve pulp quality. The pulp slurry then goes through a process of screening and cleaning using screens and cleaners 20.

Specifically, screening is a process of separating unacceptable dirt, fibers, shives, and knots from acceptable pulp by the use of screens. Forward and reverse cleaners are used in the cleaning process for separating particulate contaminants of varying specific gravities, as previously defined. The present invention provides an improved cleaner system, which is described in greater detail herein below, for use in the environment for recycling operations 5. Once the pulp slurry has passed through the screens and/or cleaners 20, the slurry then is stored in a high density chest 25, which is a storage tank for storing pulp slurries in a high consistency condition, prior to sheet formation on a paper machine 30. It will be appreciated by one skilled in the art that FIG. 1 is a very simplistic representation of a recycling environment, but may also include other components, such as filters, presses, chests (low density), deinking modules, and so forth.

Cleaner System

In an important aspect of the invention, the density of the fluid stream as it passes through a forward cleaner is different from the density of the fluid as it passes through a second forward cleaner or a reverse cleaner. The density of a fluid changes with temperature, and the fluid having a different temperature as it passes through each cleaner will have a different density during its residence in each cleaner. Hence, a contaminant that has a specific gravity of unity in one of the cleaners, will have a specific gravity either greater or lower than unity in the other cleaner.

In an important aspect of the invention, maintaining a difference in temperature of the fluid as it flows through cleaners improves the potential for separation of particles entrained in the fluid. If the contaminant has a different coefficient of thermal expansion than the fluid, then the specific gravity of the contaminant during its residence in one cleaner will be different from the specific gravity during its residence through the other cleaner. As a result, a contaminant that has a specific gravity of unity at one cleaner may have a specific gravity different from unity in the other cleaner. While not intending to be bound by any theory, separation of a contaminant is effected because the coefficient of thermal expansion of a contaminant will most likely be different from the coefficient of thermal expansion of the fluid, since the contaminant and the fluid are different physicochemical species. For the particular case of an organic contaminant in water, the cubic expansion coefficient of water at 30° C. is $3.02 \times 10^{-4}$ (CRC Handbook of Chemistry and Physics, 77th edition, CRC Press, 1997), whereas said coefficient for organic compounds is many times higher. As a result, introducing a difference in density of the fluid stream between forward and reverse cleaners will enhance the efficiency of removal of particles by the combination of the forward and reverse cleaners.

Fluid Streams

Fluid streams that include particulate contaminants may be generated from a number of different sources. In an important aspect of the invention, the particulate contaminants in the fluid stream are stickies.

Temperature Regulation

In one embodiment of the invention, a difference in density of the fluid stream resident in the forward and reverse cleaners can be induced by maintaining a difference in the temperature of the fluid stream in the forward and reverse cleaners. Although Bormett et al. (Bormett, D., Lebow, P., Ros, N., Klungness, J. Tappi J., 78(8): 179, 1995), and Maze (E. L. Maze, Paper recycling Challenges Vol. 1, Stickies, M. R. Doshi & J. M. Dyer, Eds., Doshi & Associates Inc., 1997) teach that the performance of reverse cleaners improves with increasing temperature, because of the lower viscosity of water, and the decrease in specific gravity of the contaminant at higher temperature, there is no indication of recognition of the potential for an increase in cleaner efficiency by maintaining a difference in temperature between forward and reverse cleaners.

In another aspect of the invention, a temperature difference between forward and reverse cleaners installed in any sequence can be induced through one or more of several methods. In one aspect, one of the two cleaners or sets thereof could be heated. In another aspect, one of the two sets of cleaners could be cooled. In another aspect, a temperature difference may be induced between the fluid streams entering the two cleaners by means of a heat exchanger. In yet another configuration, steam could be injected between the two cleaners, heating the intermediate fluid. Where dilution of the fluid stream is performed in between the two sets of cleaners, said dilution could be performed with fluid either warmer or cooler than the pre-diluted fluid. The cleaners can be located strategically in the process to take advantage of the natural heating and cooling effects of unit operations, as well as lags between the cleaners.

In one example from the recycling paper industry, the stock is passed through fine screens, an operation that can warm the screened water. If the fine screens are positioned in between the two cleaners, then the water entering the two cleaners would have different temperatures. In another example taken from the recycling paper industry, an alkaline water loop and an acid water loop may be operated sequentially, with the pulp stock being passed from one loop to the other. If one type of cleaner, whether forward or reverse, were operated in each loop, it would likely be operating at a different temperature than the other type of cleaner located in the other loop, on account of the temperature difference between the water streams in the two loops.

There are many ways in which a temperature gradient can be induced between or across unit operations and which are within the scope of the process of the present invention. In one aspect of the invention, the temperature gradient may be negative, or cooling the stream. In this aspect of the invention, an indirect heat exchanger may be used with cooling water as the working fluid. Another cooling option would be the direct mixing of cooling water with the stock. This would not be appropriate for a process point in which dilution is not an option, such as between two cleaner banks. Although the decrease in consistency should improve cleaner removal efficiency, the increase in pumping power required would not be economical.

In another aspect of the invention where a positive temperature gradient is desired, an indirect heat exchanger with steam as the working fluid may be employed. In an important aspect of the invention, direct steam injection maybe utilized. Direct steam injection is attractive for many reasons. This process is well established for the pulp and paper industry and is nearly 100% efficient. Another benefit of this process is that most mills have excess or waste steam available for such a process.

Figure 2:
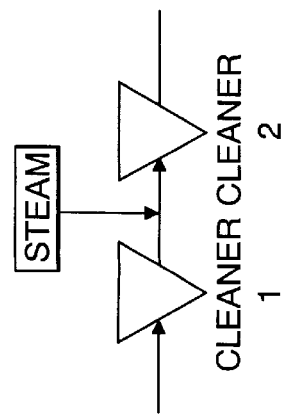
FIG. 2 shows a possible steam addition point for effecting a temperature change between forward and reverse cleaners.

A potential steam injection location could be introduced into the stock after Cleaner 1 and immediately prior to Cleaner 2, as shown in FIG. 2, where Cleaners 1 and 2 can be forward and/or reverse cleaners. In the instance where Cleaner 1 is a forward cleaner and Cleaner 2 is a reverse cleaner, the cleaner configuration of FIG. 2 would first remove heavy contraries and leave the lights and neutrals in the accepts. The steam is added at rate sufficient to cause a temperature increase in the stock of about 10° F. This temperature change causes the stickies to expand, thus lowering their specific gravity and resulting in increased separation.

In an important aspect of the invention, varying the system temperature at key process points will induce a density gradient across the cleaner system. In the operating temperature range of interest, the density of the aforementioned stickies or any other particulate contaminant may be raised or lowered with respect to water. For example, stickies that sink at one temperature will float at other temperatures and vice versa. While not intending to be bound by any theory, it is hypothesized that particular components that make up the stickies have a greater capacity for thermal expansion than the stock and water mixtures in which they are contained. Specifically, the vinyl acetate components of the stickies are believed to contribute most significantly to this behavior.

Typical recycle stock preparation systems operate near 50° C. during forward and reverse (or through) cleaning operations. The density difference between the particulate contaminant and the stock is not enough for effective separation by sequential "heavy" and "light" removing hydrocyclones. Therefore, in a very important aspect of the invention, the temperature of the stock at the forward and reverse (or through) cleaners must be changed by at least about 1° F., and in a very important aspect, at least about 10° F. This ensures that the density of the particulate contaminants at the forward and reverse cleaners will be different from one another. Furthermore, the specific gravity of the particulate contaminants preferably is about 0.0001 to about 0.2 different from the specific gravity of the carrier fluid, thereby enabling effective removal of the contaminants in accordance with the present invention.

In an alternative aspect of the invention, steam may be directly injected to the stock following the forward cleaners to create the high temperature side of the system. Entrained air may associate with the hydrophobic stickies, increasing the likelihood of removal.

In an important aspect, the process of the present invention can work with at least two forward and/or two reverse centrifugal cleaners. In alternative aspects, the present invention works with a single cleaner if (a) the fluid is first passed through at a given temperature, (b) the temperature of the fluid is changed, and (c) the fluid is passed through the same cleaner operating at a different temperature.

Centrifugal Cleaners

Centrifugal cleaners known in the art to be useful for the removal of particulate contaminants in fluid streams may be used in the process of the present invention. In an important aspect of the invention, cleaners useful in the present invention includes those types which can induce or maintain temperatures in the fluids that enter them.

The following examples illustrate methods for carrying out the invention and should be understood to be illustrative of, but not limiting upon, the scope of the invention which is defined in the appended claims.

EXAMPLES

Example 1

The furnish used was 10 lbs of bleached hardwood virgin Kraft at 0.9% consistency. The contaminants used were two hot melt glue sticks of specific gravity of 1.01 at room temperature, and two sticks (impregnated with metal specks) of specific gravity of 1.4 at room temperature. They were spread on paper with a glue gun, blended with water at 140° F. for 10 minutes, and then stirred into the stock.

A pair of commercial POSIFLO and UNIFLO centrifugal cleaners manufactured by Beloit Corporation of Pittsfield, Mass. was used in series. The POSIFLO cleaner is designed to separate contaminants of specific gravity higher than that of the fluid, and the UNIFLO cleaner is designed to separate contaminants of specific gravity lower than that of the fluid. The system was brought to 120° F., and the stock was pumped through the cleaners. Handsheets were prepared from furnish taken from the feed and accept streams and are called the 120 F. samples. The stock was now recirculated through the cleaners and handsheets were prepared from the feed and accepts. These are designated as the 120 F./120 F. samples. The temperature of the stock initially cleaned once at 120° F. was raised to 130° F. The stock was pumped through the cleaners, and the feed and accepts are designated as the 120 F./130 F. samples. Hence, the 120 F./120 F. samples refer to material passed through two sets of cleaners kept at 120° F., and the 120 F./130 F. samples refer to stock cleaned sequentially at 120° F. and 130° F.

The number of stickies exceeding 0.04 mm$^2$ in size in the various UNIFLO feed and accepts handsheets are listed in Table 1. These large stickies are the most problematic in the recycle paper industry since they are easily visible. It is clear that cleaning either once or twice at 120° F. does not significantly lower the stickies counts in the accepts sample by comparison to the feed. However, cleaning the stock sequentially at 120° F. and 130° F. reduces the stickies in the accepts stream by a factor of two in comparison to the feed. Hence, centrifugal cleaning at different temperatures significantly increases cleaner efficiency.

TABLE 1

Stickies of area >0.04 mm$^2$ UNIFLO feed and accepts

|  | Feed | Accepts |
| --- | --- | --- |
| 120F | 24 | 27 |
| 120F/120F | 19 | 21 |
| 120F/130F | 22 | 11 |

Example 2

Figure 3:
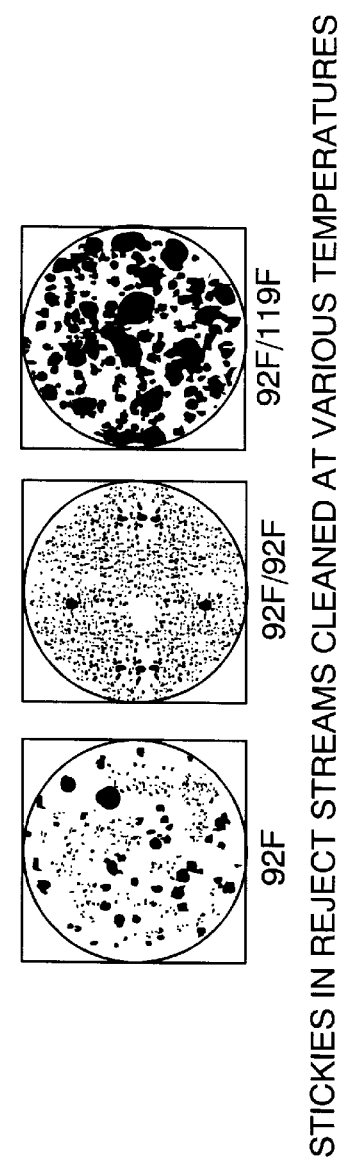
FIG. 3 illustrates results obtained from the method of the invention.

Four hot melt glue sticks (Black and Decker 2 Temp) weighing 53 g. were melted in streaks with a glue gun on white paper, blended in water to disperse the material, and then mixed with 8 lbs of bleached hardwood Kraft at 0.8% consistency. The stock was heated to 92° F. and pumped through the above-referenced UNIFLO cleaner. The reject stream was collected. A portion of the stock was then recirculated through the cleaner, and the reject stream was collected. The once-cleaned stock was then heated to 119° F., and the reject stream was collected. Each reject stream was then filtered through a filter paper, whereupon the stickies in the stream were transferred to the surface of the filter paper. The filter paper from the stock cleaned once at 92° F. is called 92 F. sample, the filter paper from the stock cleaned twice at 92° F. is called the 92 F./92 F. sample, and the filter paper from the stock cleaned sequentially at 92° F. and at 119° F. is called the 92 F./119 F. sample. Images of these filter papers are depicted in FIG. 3. It is clear that the first pass through the cleaners 92° F. removes most of the contaminants, since the 92 F. sample is substantially populated with stickies. The 92 F./92 F. sample was relatively clean, since the stickies were removed in the first pass through the cleaners, and little additional cleaning is obtained from the second pass. However, the 92 F./119 F. sample contains much more material than the 92 F./92 F. sample, indicating that more contaminants are removed through sequential cleaning at 92° F. and at 119° F., than through sequential cleaning at 92° F. alone.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for removing particulate contaminants from a fluid stream, the method comprising:

supplying a liquid fluid stream to at least one first centrifugal cleaner, the liquid fluid stream including a liquid carrier fluid and particulate contaminants;

removing particulate contaminants from the liquid fluid stream having a specific gravity of at least about 0.0001 different from the specific gravity of the liquid carrier fluid;

adjusting the temperature of the liquid fluid stream leaving the cleaner by an amount effective to provide particulate contaminants remaining in the liquid fluid stream with a specific gravity of at least about 0.0001 different from the specific gravity of the liquid carrier fluid; and removing particulate contaminants having a specific gravity of at least about 0.0001 different from the specific gravity of the liquid carrier fluid.

2. A method for removing particulate contaminants according to claim 1 wherein the temperature of the fluid stream leaving the first centrifugal cleaner is adjusted and particulate contaminants remaining in the fluid stream are removed by supplying the fluid stream back to the first centrifugal cleaner.

3. A method for removing particulate contaminants according to claim 1 wherein the temperature of the fluid stream leaving the first centrifugal cleaner is adjusted and particulate contaminants remaining in the fluid stream are removed by supplying the fluid stream to at least one second centrifugal cleaner.

4. A method for removing particulate contaminants according to claim 1 wherein the fluid stream leaving the first centrifugal cleaner is supplied back to the first centrifugal cleaner and the temperature of the fluid stream is adjusted.

5. A method for removing particulate contaminants according to claim 1 wherein the fluid stream leaving the first centrifugal cleaner is supplied to at least one second centrifugal cleaner and the temperature of the fluid stream is adjusted.

6. A method for removing particulate contaminants according to claim 1 wherein adjusting the temperature of the fluid stream is effective for providing the particulate contaminants with a specific gravity of from about 0.0001 to about 0.2 different from the specific gravity of the carrier fluid.

7. A method for removing particulate contaminants according to claim 1 wherein the particulate contaminants are in a slurry of pulp and water.

8. A method for removing particulate contaminants according to claim 7 wherein the particulate contaminants are stickies.

9. A method for removing particulate contaminants according to claim 1 wherein the temperature is adjusted by raising or lowering the temperature of the fluid stream at least about 1° F.

10. An improved method for removing particulate contaminants from a liquid fluid stream, comprising the steps of:

at a first temperature, passing a liquid fluid stream including a liquid carrier fluid and particulate contaminants through a centrifugal cleaner, removing particulate contaminants having a first specific gravity range from the liquid fluid stream;

at a second temperature, passing the liquid fluid stream containing particulate contaminants through a second centrifugal cleaner, said second temperature being different from said first temperature and said second temperature changing the specific gravities of the liquid carrier fluid and particulate contaminants; and removing particulate contaminants having a second specific gravity range from said liquid fluid liquid stream.

11. The method of claim 10, wherein the first and second centrifugal cleaners are the same.

12. The method of claim 10, wherein the first centrifugal cleaner is a forward cleaner and the second centrifugal cleaner is a reverse cleaner.

13. The method of claim 10, wherein the second temperature of the fluid stream is higher than the first temperature of the fluid stream.

14. The method of claim 10, wherein the second temperature of the fluid stream is lower that the first temperature of the fluid stream.

15. The method of claim 10, wherein the first and second temperatures of the fluid stream are at least about 1 degree F. different.

16. The method of claim 10, wherein the first and second specific gravity ranges are from at least about 0.0001 to about 0.2 different from the specific gravity of the carrier fluid.

* * * * *